July 16, 1963   L. V. PHEIL   3,097,454
SIZE CONTROL FOR MULTIPLE WHEEL GRINDING MACHINES
Filed Dec. 16, 1960
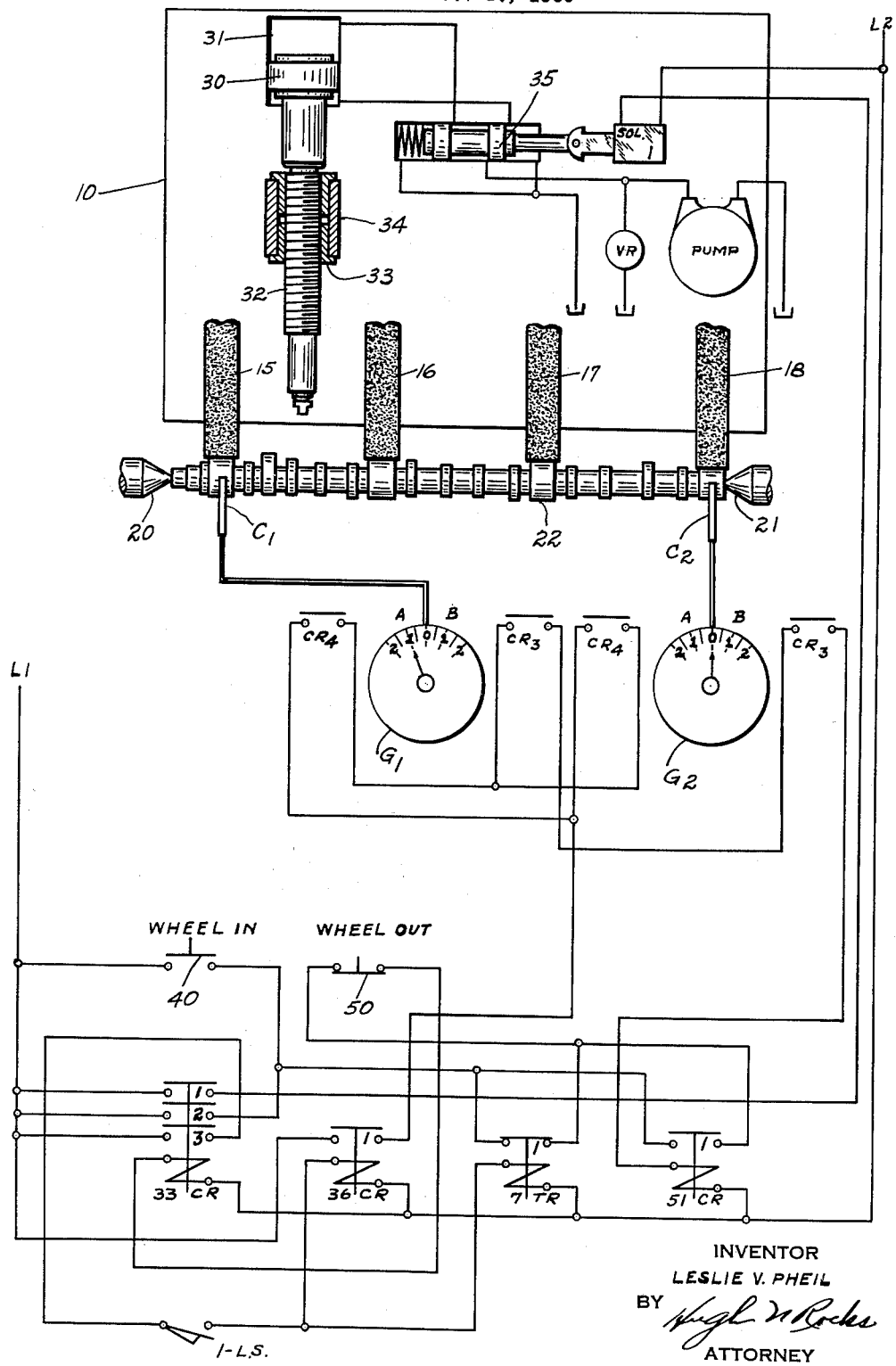
INVENTOR
LESLIE V. PHEIL
BY
ATTORNEY

United States Patent Office 3,097,454
Patented July 16, 1963

3,097,454
SIZE CONTROL FOR MULTIPLE WHEEL
GRINDING MACHINES
Leslie V. Pheil, Wallisellen, Zurich, Switzerland, assignor
to Landis Tool Company, Waynesboro, Pa.
Filed Dec. 16, 1960, Ser. No. 76,391
5 Claims. (Cl. 51—165)

This invention relates to gauging devices for grinding machines, particularly for multiple wheel grinding machines for grinding axially spaced portions of a workpiece.

On workpieces of this type, the axially spaced portions are usually of different diameters and widths. The diameter and width of the respective grinding wheels varies with that of the portion of the workpiece to be ground.

Because of the many variables involved in the operation of a grinding machine of this type, it is practically impossible for each portion of the work to be ground to exact size simultaneously. The tolerance on such workpieces is usually plus or minus a selected amount above or below the nominal size, and any dimensions between the high and low tolerance limit is acceptable.

It is, therefore, an object of the present invention to provide means for gauging at least two of the spaced portions of a workpiece, preferably the end portions, and to provide the gauges with means for stopping the grinding operation if one of the portions of the workpiece is ground to a low limit before the other portion has been ground to the high limit.

Another object is to provide control means for a grinding operation on axially spaced portions of a workpiece whereby the grinding operation is stopped when both portions have been ground to the high limit of the tolerance range.

The drawing is a hydraulic and electric diagram for the feed and size control apparatus of a multiple wheel grinding machine.

Grinding wheels 15, 16, 17 and 18 are rotatably mounted on wheel support 10. The work support is represented by headstock center 20 and footstock center 21 on which workpiece 22 is rotatably supported.

Caliper $C_1$ is applied to a portion at the left hand end of workpiece 22. Caliper $C_2$ is applied to a portion at the right hand end of workpiece 22. Calipers $C_1$ and $C_2$ are connected to visual gauges $G_1$ and $G_2$ on which the high tolerance side is indicated by A and the low tolerance side is indicated by B. Each caliper and its associated gauge may be referred to as a sizing device.

Each gauge $G_1$ and $G_2$ controls a high limit contact CR4 and a low limit contact CR3. These contacts are further identified by the addition of $G_1$ representing workpiece 22 at the left hand end and $G_2$ representing workpiece 22 at the right hand end. Thus, the contacts are identified as $G_1CR4$, $G_2CR4$, $G_1CR3$ and $G_2CR3$. Contacts $G_1CR4$ and $G_2CR4$ are connected in parallel. Contacts $G_1CR3$ and $G_2CR3$ are connected in series with each other and also in series with each of the contacts $G_1CR4$ and $G_2CR4$.

The above mentioned contacts close when calipers $C_1$ and $C_2$ are applied to the workpiece. This arrangement is preferred for reasons of safety. The control of the feed mechanism can be performed just as well if the gauge contacts function by closing instead of by opening.

The means for advancing and retracting the grinding wheels relative to workpiece 22 is shown for the purpose of illustration as a piston 30 in cylinder 31 and connected to feed screw 32 rotatable in nut 33 which is attached to portion 34 of wheel support 10. The actual feed mechanism is similar to that shown in co-pending application, Serial No. 791,684, filed February 6, 1959, now Patent No. 3,047,988, dated August 7, 1962.

Operation

To start the feed movement, wheel-in push button switch 49 is closed, completing a circuit through normally closed timer relay contact 7TR1 and normally closed wheel-out push button switch 50 to energize infeed relay 33CR.

Relay contact 33CR1 energizes valve solenoid 1, shifting feed valve 35 to the left and directing fluid under pressure from the pump to the head end of the rapid feed cylinder 31. Relay contact 33CR2 is a holding contact through normally closed timer relay contact 7TR1 and normally closed wheel-out push button 50.

After the grinding wheels have performed a predetermined amount of grinding on workpiece 22, limit switch 1LS is closed to complete a circuit from relay contact 33CR3 to energize relays 36CR and 7TR.

At the same time, calipers $C_1$ and $C_2$ are applied to the work either manually or automatically, and the gauge contacts are closed by the effect on the calipers of oversize work.

Relay contact 36CR1 completes a circuit through closed gauge contact $G_1CR4$ or $G_2CR4$ and closed gauge contacts $G_1CR3$ and $G_2CR3$ to energize relay 51CR.

Relay contact 51CR1 in parallel with normally closed relay contact 7TR1 in the circuit to infeed relay 33CR through wheel-out push button 50, is closed. After a predetermined interval during which the grinding wheels are advanced while infeed relay 33CR is energized through normally closed contact 7TR1, said contact 7TR1 times open, leaving relay contact 51CR1 in control of infeed relay 33CR.

As the grinding operation proceeds, gauge $G_1$ will indicate when the high limit on its portion of the work has been reached and gauge contact $G_1CR4$ will open. However, the circuit to gauge contact relay 51CR remains closed through gauge contacts $G_2CR4$, $G_1CR3$ and $G_2CR3$.

When gauge $G_2$ indicates that the high limit on its portion of the work has been reached, gauge contact $G_2CR4$ opens, opening the circuit to relay 51CR, deenergizing relay 33CR and valve solenoid 1. Feed valve 35 is shifted to the right, directing fluid to the lower end of rapid feed cylinder 31 and retracting the wheels, with both portions of the work at the high limit.

If either of the gauged portions of the work is ground to the low limit before the other portion is ground to the high limit, one of the contacts $G_1CR3$ or $G_2CR3$ will open the circuit to relay 51CR and the grinding operation will be stopped even though one portion of the work is above the oversize limit.

With this arrangement, neither portion of the work can ever be ground below the low limit which will cause the work to be scrapped. Under ordinary conditions, one portion of the work is almost certain to pass the high limit before the other is ground to the low limit and thus both portions will be within the tolerance range. The grinding operation will be stopped when the second portion of the work is ground to the high limit.

I claim:

1. In a multiple wheel grinding machine for grinding axially spaced portions of a workpiece, a work support for supporting said workpiece, a grinding wheel support, two or more grinding wheels rotatably mounted on said grinding wheel support, feeding means for effecting a relative transverse feeding movement between said supports to perform a grinding operation, control means for said feeding means, means for maintaining size between the high and low limits of tolerance on two axially spaced portions of said workpiece comprising a sizing device for each of said two axially spaced portions, each sizing device having a high limit contact and a low limit contact, means operable by said sizing devices to reverse said feeding means when both of said two axially spaced portions have been ground to diameters between said high and said low limits.

2. In a multiple wheel grinding machine for grinding axially spaced portions of a workpiece, a work support for supporting said workpiece, a grinding wheel support, two or more grinding wheels rotatably mounted on said grinding wheel support, feeding means for effecting a relative transverse feeding movement between said supports to perform a grinding operation, control means for said feeding means, means for maintaining size between the high and low limits of tolerance on two axially spaced portions of said workpiece comprising a sizing device for each of said two axially spaced portions, each sizing device having a high limit contact and a low limit contact, means operable by said sizing devices to reverse said feeding means when one of said two axially spaced portions is ground to its low limit before the other is ground to its high limit.

3. In a multiple wheel grinding machine for grinding axially spaced portions of a workpiece, a work support for supporting said workpiece, a grinding wheel support, two or more grinding wheels rotatably mounted on said grinding wheel support, feeding means for effecting a relative transverse feeding movement between said supports to perform a grinding operation, control means for said feeding means, means for maintaining size between the high and low limits of tolerance on two axially spaced portions of said workpiece comprising a sizing device for each of said two axially spaced portions, each sizing device having a high limit contact and a low limit contact, said contacts being actuated and the feeding movement continued so long as said two axially spaced portions are over the high limit, said low limit contacts being connected in series with each other and also being connected in series with each of the high limit contacts whereby opening the low limit contact for one sizing device before opening the high limit contact for the other sizing device will reverse said feeding means.

4. In a multiple wheel grinding machine for grinding axially spaced portions of a workpiece, a work support for supporting said workpiece, a grinding wheel support, two or more grinding wheels rotatably mounted on said grinding wheel support, feeding means for effecting a relative transverse feeding movement between said supports to perform a grinding operation, control means for said feeding means, means for maintaining size between the high and low limits of tolerance on two axially spaced portions of said workpiece comprising a sizing device for each of said two axially spaced portions, each sizing device having a high limit contact and a low limit contact, said contacts being closed so long as said two axially spaced portions are over the high limit, said high limit contacts being connected in parallel with one another and in series with the low limit contacts whereby opening both high limit contacts successively or together will reverse said feeding means.

5. In a multiple wheel grinding machine for grinding axially spaced portions of a workpiece, a work support for supporting said workpiece, a grinding wheel support, two or more axially spaced grinding wheels rotatably mounted on said grinding wheel support, feeding means for effecting a relative transverse feeding movement between said supports to perform a grinding operation, control means for said feeding means, means for maintaining size between the oversize and undersize limits of tolerance relative to a nominal size on two axially spaced portions of said workpiece of the same diameter or of different diameters comprising a sizing device for each of said two axially spaced portions, each sizing device having an oversize limit contact and an undersize limit contact, and means operable by said sizing devices to stop said grinding operation when said two axially spaced portions have been ground to different diameters between said respective oversize and undersize limits.

References Cited in the file of this patent
UNITED STATES PATENTS 2,599,992     Hill _____ June 10, 1952